(12) United States Patent
Perin et al.

(10) Patent No.: US 12,429,568 B2
(45) Date of Patent: Sep. 30, 2025

(54) TECHNIQUES FOR PEAK DETECTION IN A LIDAR SYSTEM

(71) Applicant: Aeva, Inc., Mountain View, CA (US)

(72) Inventors: Jose Krause Perin, Mountain View, CA (US); Esha John, Sunnyvale, CA (US); Kumar Bhargav Viswanatha, Santa Clara, CA (US); Mina Rezk, Haymarket, VA (US); Rajendra Tushar Moorti, Mountain View, CA (US)

(73) Assignee: Aeva, Inc., Mountain View, CA (US)

( * ) Notice: Subject to any disclaimer, the term of this patent is extended or adjusted under 35 U.S.C. 154(b) by 264 days.

(21) Appl. No.: 17/745,244

(22) Filed: May 16, 2022

(65) Prior Publication Data
US 2022/0397668 A1 Dec. 15, 2022

Related U.S. Application Data

(60) Provisional application No. 63/209,774, filed on Jun. 11, 2021.

(51) Int. Cl.
*G01S 17/66* (2006.01)
*G01S 7/491* (2020.01)
(Continued)

(52) U.S. Cl.
CPC ............ *G01S 7/4912* (2013.01); *G01S 7/491* (2013.01); *G01S 7/497* (2013.01); *G01S 17/34* (2020.01); *G01S 17/66* (2013.01); *G01S 17/931* (2020.01)

(58) Field of Classification Search
CPC ........ G01S 7/4912; G01S 7/491; G01S 7/497; G01S 17/34; G01S 17/66; G01S 17/931; G01S 7/4917; G01S 17/89
See application file for complete search history.

(56) References Cited

U.S. PATENT DOCUMENTS

| 8,947,644 | B2 * | 2/2015 | Halmos | ................... G01S 17/58 |
| | | | | 356/3.01 |
| 11,047,953 | B1 | 6/2021 | Sankar | |

(Continued)

OTHER PUBLICATIONS

Non-Final Office action Correspondence of U.S. Appl. No. 17/745,420 mailed Jun. 11, 2025, 12 pages.

*Primary Examiner* — Jonathan M Hansen
(74) *Attorney, Agent, or Firm* — Womble Bond Dickinson (US) LLP

(57) ABSTRACT

A light detection and ranging (LIDAR) system performs a method including generating a frequency domain waveform based on a baseband signal in a time domain, determining a first likelihood metric for frequencies in the frequency domain waveform, and identifying one or more frequencies in the frequency domain waveform that exceed a threshold value for the first likelihood metric. The method further includes determining a second likelihood metric for the frequencies in the frequency domain waveform, selecting a peak frequency from the frequency domain waveform corresponding to the frequency with the highest value for the second likelihood metric based on the one or more frequencies in the frequency domain waveform that exceed the threshold value for the first likelihood metric, and determining one or more properties of a target based at least in part on the selected peak frequency and the corresponding values of the first and second likelihood metrics.

17 Claims, 14 Drawing Sheets

(51) Int. Cl.
  *G01S 7/4912* (2020.01)
  *G01S 7/497* (2006.01)
  *G01S 17/34* (2020.01)
  *G01S 17/931* (2020.01)

(56) References Cited

U.S. PATENT DOCUMENTS

| | | |
|---|---|---|
| 12,189,038 B2 | 1/2025 | Pacala |
| 2017/0329013 A1* | 11/2017 | Halmos ................ G01S 7/4802 |
| 2019/0179018 A1 | 6/2019 | Gunnam |
| 2019/0317191 A1 | 10/2019 | Santra |
| 2020/0018854 A1* | 1/2020 | Hicks .................... G01S 7/4802 |
| 2020/0200904 A1* | 6/2020 | Singer .................... G01S 17/34 |
| 2021/0293960 A1* | 9/2021 | Kreitinger ............. G01S 7/4917 |
| 2021/0325519 A1 | 10/2021 | Shi |

* cited by examiner

TECHNIQUES FOR PEAK DETECTION IN A LIDAR SYSTEM

RELATED APPLICATIONS

This application claims priority from and the benefit of U.S. Provisional Patent Application No. 63/209,774 filed on Jun. 11, 2021, the entire contents of which are incorporated herein by reference in their entirety.

FIELD

The present disclosure is related to light detection and ranging (LIDAR) systems in general, and more particularly to peak detection in frequency-modulated continuous-wave (FMCW) LIDAR systems.

BACKGROUND

Frequency-Modulated Continuous-Wave (FMCW) LIDAR systems use tunable, infrared lasers for frequency-chirped illumination of targets, and coherent receivers for detection of backscattered or reflected light from the targets that are combined with a local copy of the transmitted signal. Mixing the local copy with the return signal, delayed by the round-trip time to the target and back, generates signals at the receiver with frequencies that are proportional to the distance to each target in the field of view of the system. Human safety considerations mandate the use of low-power lasers so that reflections from objects have very low signal strength. The range and accuracy of a LIDAR system is a function of signal-to-noise ratio, yet conventional solutions fail to reliably detect targets with a weak return signal while also limiting false target detections.

SUMMARY

The present disclosure describes examples of systems and methods for peak detection in FMCW LIDAR.

A light detection and ranging (LIDAR) system includes an optical scanner to transmit an optical beam towards, and receive a return signal from, a target and an optical processing system coupled to the optical scanner to generate a baseband signal in a time domain from the return signal, the baseband signal comprising frequencies corresponding to LIDAR target ranges. The LIDAR system further includes a signal processing system coupled to the optical processing system including a processor and a memory operatively coupled to the processor, the memory to store instructions that, when executed by the processor, cause the LIDAR system to generate a frequency domain waveform based on the baseband signal in the time domain, determine a first likelihood metric for frequencies in the frequency domain waveform, and identify one or more frequencies in the frequency domain waveform that exceed a threshold value for the first likelihood metric. The processor is further to determine a second likelihood metric for the frequencies in the frequency domain waveform, select a peak frequency from the frequency domain waveform corresponding to the frequency with the highest value for the second likelihood metric based on the one or more frequencies in the frequency domain waveform that exceed the threshold value for the first likelihood metric, and determine one or more properties of a target based at least in part on the selected peak frequency and the corresponding values for the first and second likelihood metrics.

In some embodiments, the first likelihood metric is the same as the second likelihood metric. In some embodiments, the first likelihood metric is different from the second likelihood metric. In some embodiments, the processor is further to determine that the peak frequency comprises a band of frequencies exceeding the threshold value. In some embodiments, the processor is further to determine that the band of frequencies exceeding the threshold value has a width larger than a minimum threshold width. In some embodiments, the processor identifies the one or more frequencies in the frequency domain waveform that exceed the threshold value for the first likelihood metric prior to selecting the peak frequency from the frequency domain.

In some embodiments, the first likelihood metric and the second likelihood metric each comprise one of an intensity or a signal-to-noise ratio. In some embodiments, the first likelihood metric and the second likelihood metric are selected based on previously collected information associated with the LIDAR system or the target. In some embodiments, the processor is further to in response to determining that there are no frequencies in the frequency domain waveform that exceed the threshold value for the first likelihood metric, determine a third likelihood metric for the frequencies in the frequency domain waveform and a second threshold value for the first likelihood metric, wherein the third likelihood metric is different from at least the second likelihood metric, identify one or more frequencies in the frequency domain waveform that exceed the second threshold value for the first likelihood metric, and select the peak frequency from the one or more frequencies exceeding the second threshold value, the peak frequency corresponding to the highest value for the third likelihood metric.

In some embodiments, a method, includes generating a frequency domain waveform based on a baseband signal in a time domain, determining a first likelihood metric for frequencies in the frequency domain waveform and identifying one or more frequencies in the frequency domain waveform that exceed a threshold value for the first likelihood metric. The method further includes determining a second likelihood metric for the frequencies in the frequency domain waveform, selecting a peak frequency from the frequency domain waveform corresponding to the frequency with the highest value for the second likelihood metric based on the one or more frequencies in the frequency domain waveform that exceed the threshold value for the first likelihood metric, and determining one or more properties of a target based at least in part on the selected peak frequency and the corresponding values for the first and second likelihood metrics.

In some embodiments, a non-transitory computer-readable medium containing instructions that, when executed by a processing device in a LIDAR system, cause the processing device of the LIDAR system to generate a frequency domain waveform based on the baseband signal in the time domain, determine a first likelihood metric for frequencies in the frequency domain waveform, and identify one or more frequencies in the frequency domain waveform that exceed a threshold value for the first likelihood metric. The processing device is further to determine a second likelihood metric for the frequencies in the frequency domain waveform, select a peak frequency from the frequency domain waveform corresponding to the frequency with the highest value for the second likelihood metric based on the one or more frequencies in the frequency domain waveform that exceed the threshold value for the first likelihood metric, and determine one or more properties of a target based at least in part on the selected peak frequency and the corresponding values for the first and second likelihood metrics.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

The present disclosure describes various examples of LIDAR systems and methods for peak detection using one or more likelihood metrics for thresholding and peak selection in a LIDAR system to improve target detection and reduce false detections. According to some embodiments, the described LIDAR system described herein may be implemented in any sensing market, such as, but not limited to, transportation, manufacturing, metrology, medical, virtual reality, augmented reality, and security systems. According to some embodiments, the described LIDAR system is implemented as part of a front-end frequency modulated continuous-wave (FMCW) device that assists with spatial awareness for automated driver assist systems, or self-driving vehicles.

Lidar systems described by the embodiments herein include coherent scan technology to detect a signal returned from a target to generate a coherent heterodyne signal, from which range and velocity information of the target may be extracted. The signal may be converted into one or more frequency bins, each with a magnitude of the associated frequencies within the bin. In some scenarios, a target detection may correspond to a large magnitude (i.e., a peak) for one or more frequency bins. However, selecting a peak that properly corresponds to an actual target detection may be difficult due to internal and external noise sources and other interferences that may occur. Using the techniques described herein, embodiments of the present invention can, among other things, address the issues described above by generating and using one or more likelihood metrics to perform detection thresholding and peak selection. Accordingly, the probability of detecting a target is increased while the probability of false detections is increased by using one or more likelihood metrics.

Figure 1:
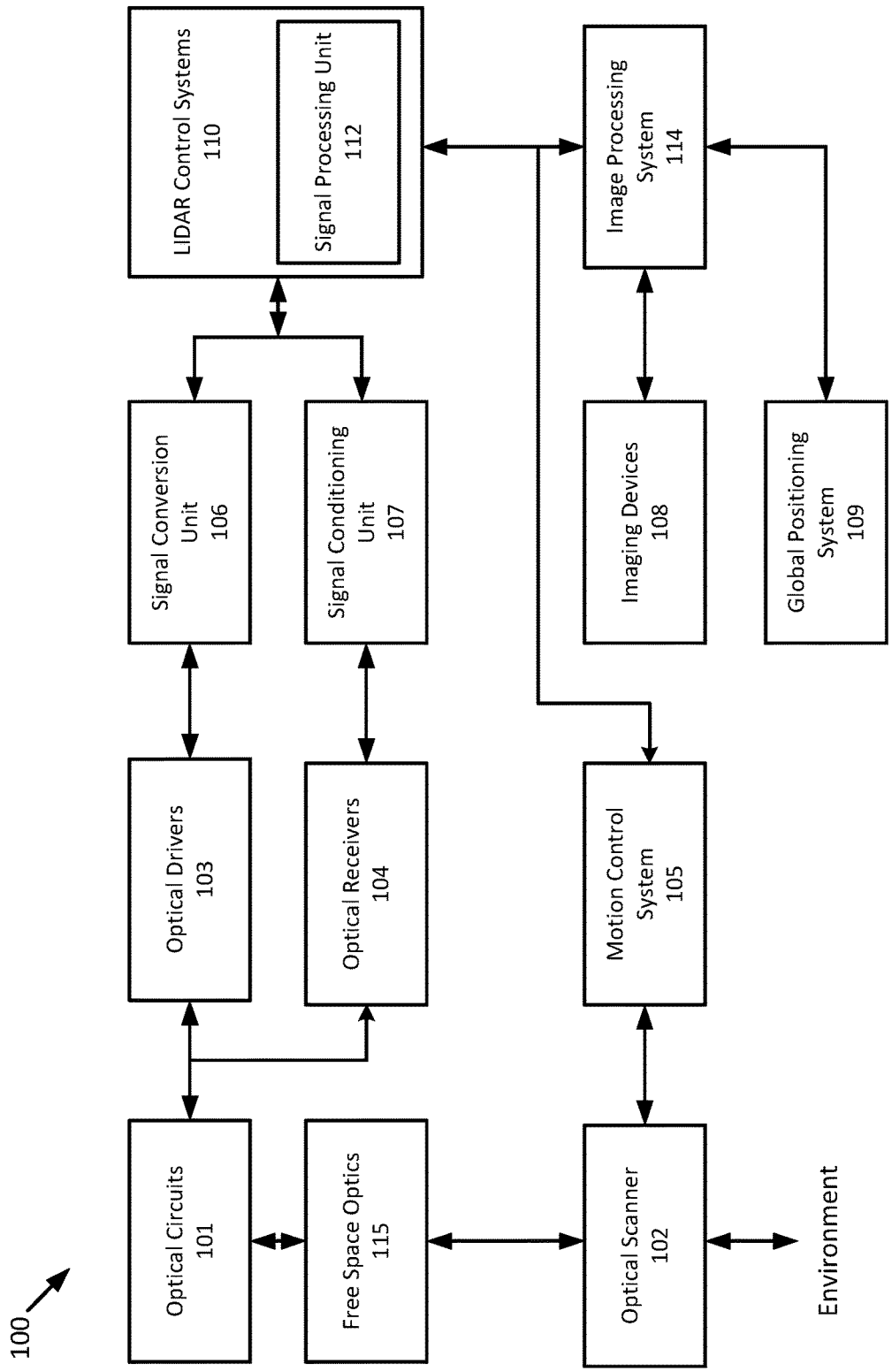
FIG. 1 is a block diagram illustrating an example LIDAR system according to the present disclosure.

FIG. 1 illustrates a LIDAR system 100 according to example implementations of the present disclosure. The LIDAR system 100 includes one or more of each of a number of components, but may include fewer or additional components than shown in FIG. 1. One or more of the components depicted in FIG. 1 can be implemented on a photonics chip, according to some embodiments. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct, e.g., via signal processor unit 112, the optical drivers 103 to independently modulate one or more optical beams, and these modulated signals propagate through the optical circuits 101 to the free space optics 115. The free space optics 115 directs the light at the optical scanner 102 that scans a target environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from an environment pass through the optical circuits 101 to the optical receivers 104. Because the polarization of the light has been transformed, it may be reflected by a polarization beam splitter along with the portion of polarized light that was reflected back to the optical circuits 101. In such scenarios, rather than returning to the same fiber or waveguide serving as an optical source, the reflected signals can be reflected to separate optical receivers 104. These signals interfere with one another and generate a combined signal. The combined signal can then be reflected to the optical receivers 104. Also, each beam signal that returns from the target environment may produce a time-shifted waveform. The temporal phase difference between the two waveforms generates a beat frequency measured on the optical receivers 104 (e.g., photodetectors).

The analog signals from the optical receivers 104 are converted to digital signals by the signal conditioning unit 107. These digital signals are then sent to the LIDAR control systems 110. A signal processing unit 112 may then receive the digital signals to further process and interpret them. In some embodiments, the signal processing unit 112 also receives position data from the motion control system 105 and galvanometers (not shown) as well as image data from the image processing system 114. The signal processing unit 112 can then generate 3D point cloud data that includes information about range and/or velocity points in the target environment as the optical scanner 102 scans additional points. The signal processing unit 112 can also overlay 3D point cloud data with image data to determine velocity and/or distance of objects in the surrounding area. The signal processing unit 112 also processes the satellite-based navigation location data to provide data related to a specific global location.

Figure 2:
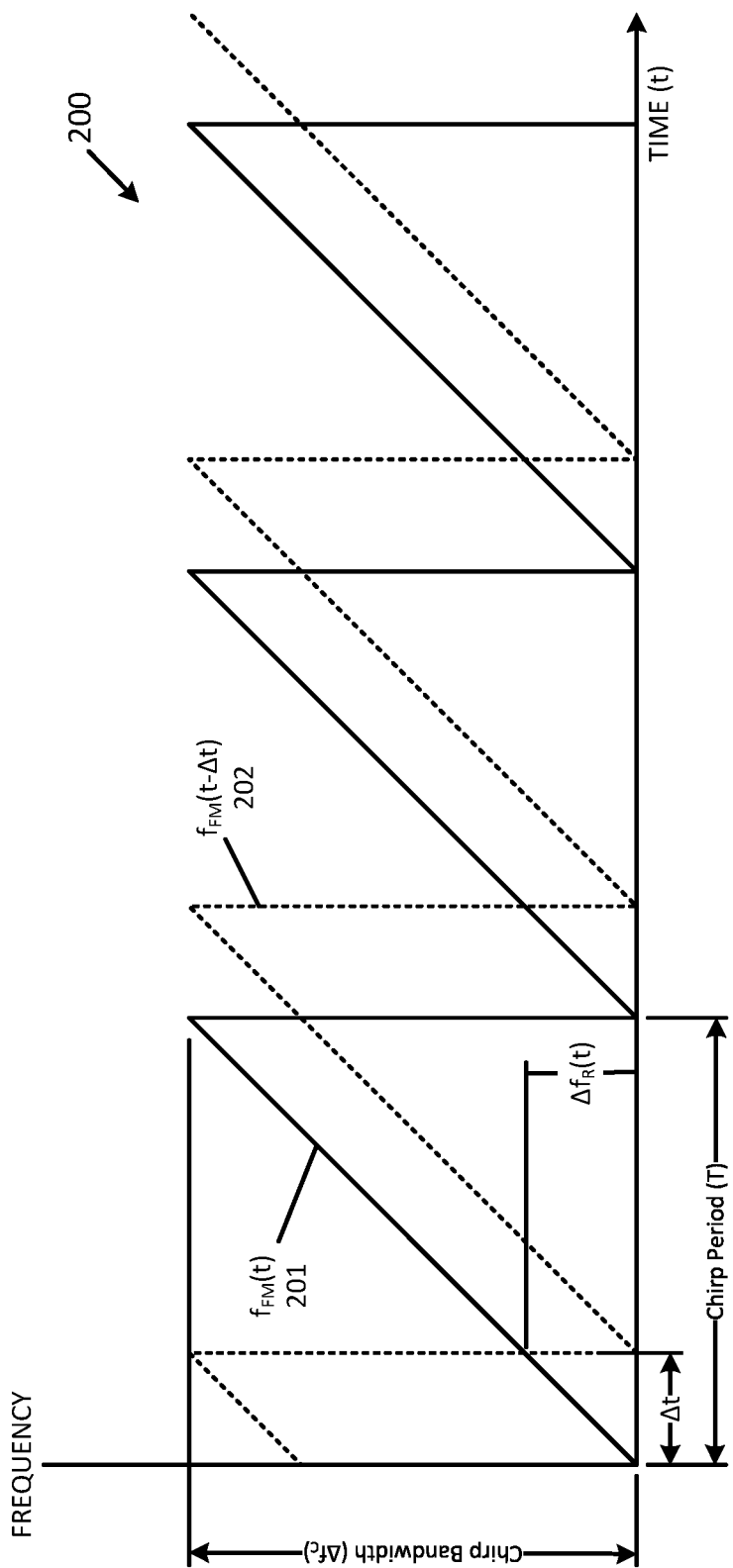
FIG. 2 is a time-frequency diagram illustrating one example of LIDAR waveforms according to the present disclosure.

FIG. 2 is a time-frequency diagram 200 of an FMCW scanning signal 201 that can be used by a LIDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3A:
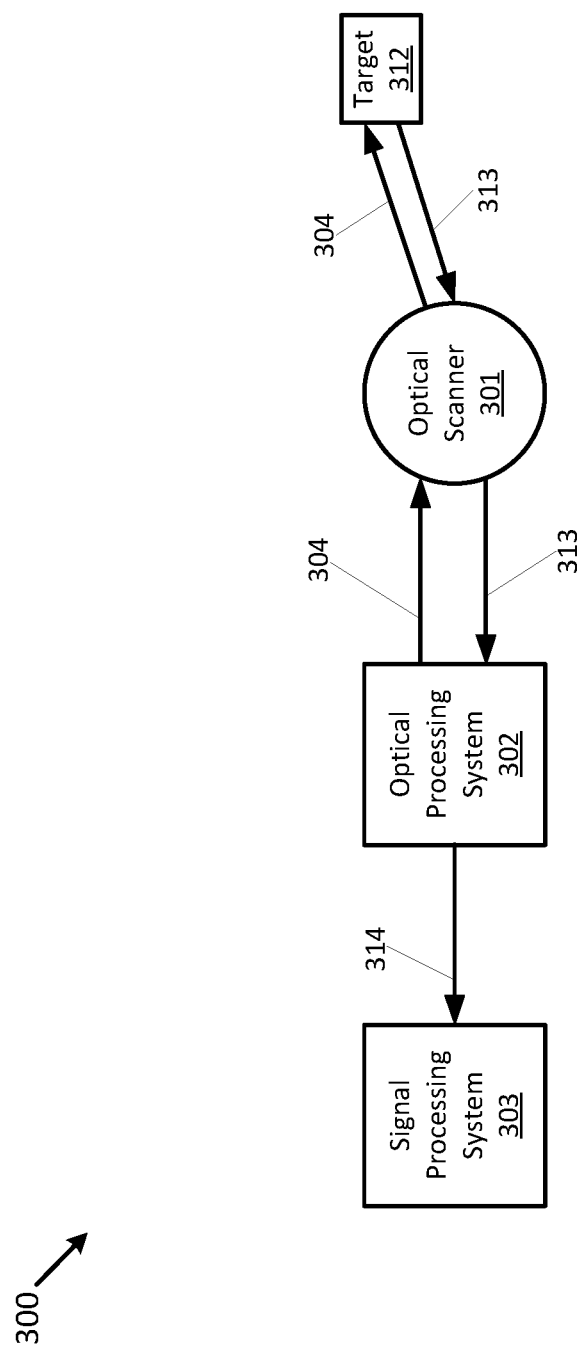
FIG. 3A is a block diagram illustrating an example LIDAR system according to the present disclosure.

FIG. 3A is a block diagram illustrating an example LIDAR system 300 (e.g., a FMCW LIDAR system) according to the present disclosure. Example system 300 includes an optical scanner 301 to transmit an FMCW (frequency-modulated continuous wave) optical beam 304 and to receive a return signal 313 from reflections of the optical beam 304 from targets such as target 312 in the field of view (FOV) of the optical scanner 301. System 300 also includes an optical processing system 302 to generate a baseband electrical signal 314 in the time domain from the return signal 313, where the baseband electrical signal 314 contains frequencies (e.g., beat frequencies) corresponding to LIDAR target ranges. Optical processing system 302 may include elements of free space optics 115, optical circuits 101, optical drivers 103 and optical receivers 104 in LIDAR system 100. System 300 also includes a signal processing system 303 to measure energy of the baseband electrical signal 314 in the frequency domain, to compare the energy to an estimate of LIDAR system noise, and to determine one or more likelihood metrics for determining whether a signal peak in the frequency domain indicates a detected target. Signal processing system 303 may include elements of signal conversion unit 106, signal conditioning unit 107, LIDAR control systems 110 and signal processing unit 112 in LIDAR system 100.

Figure 3B:
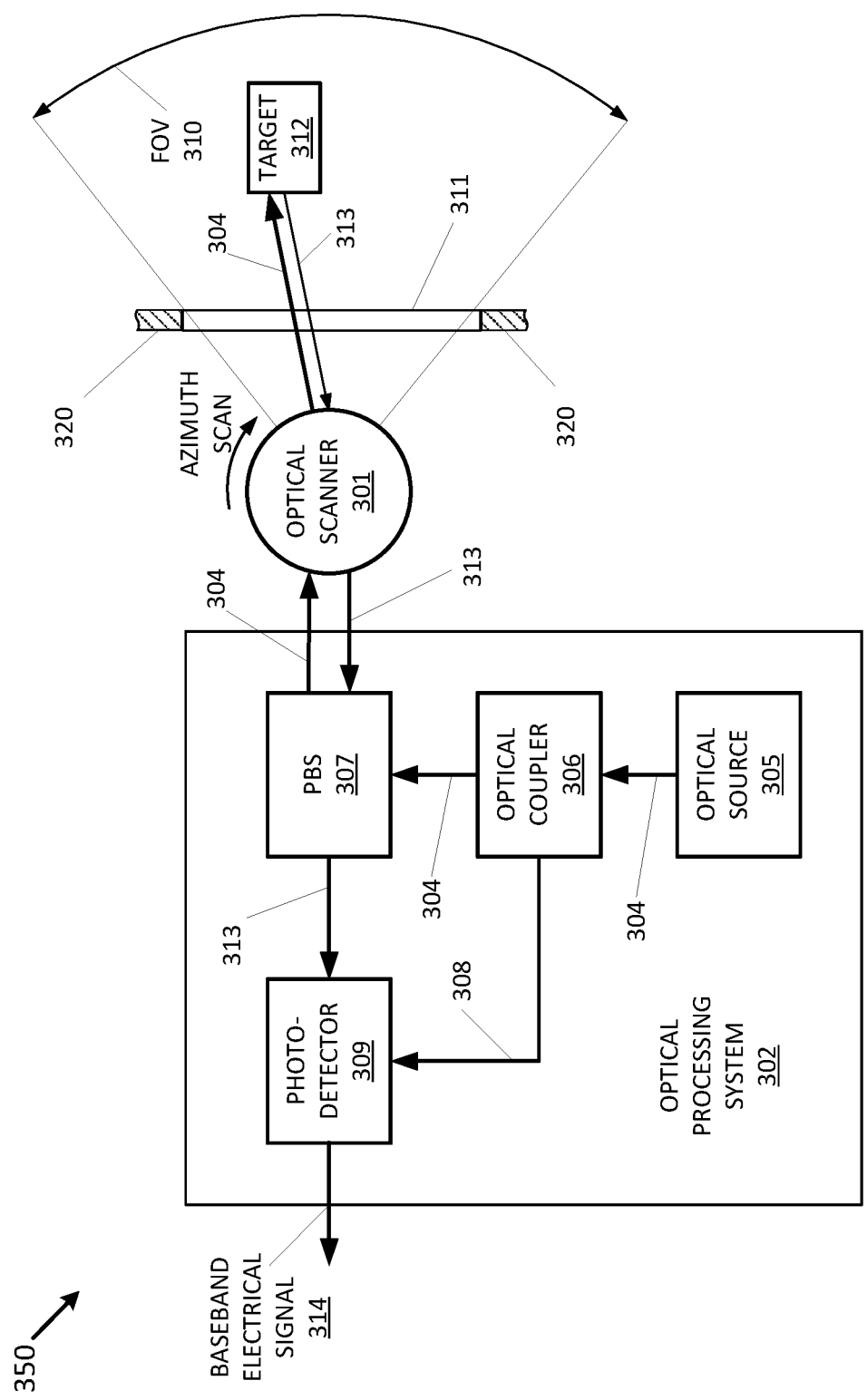
FIG. 3B is a block diagram illustrating an electro-optical optical system according to the present disclosure.

FIG. 3B is a block diagram illustrating an example electro-optical system 350. According to some embodiments, electro-optical system 350 includes the optical scanner 301, similar to the optical scanner 102 illustrated and described in relation to FIG. 1. Electro-optical system 350 also includes the optical processing system 302, which as noted above, may include elements of free space optics 115, optical circuits 101, optical drivers 103, and optical receivers 104 in LIDAR system 100.

Electro-optical processing system 302 includes an optical source 305 to generate the frequency-modulated continuous-wave (FMCW) optical beam 304. The optical beam 304 may be directed to an optical coupler 306 that is configured to couple the optical beam 304 to a polarization beam splitter (PBS) 307 and a sample 308 of the optical beam 304 to a photodetector (PD) 309. The PBS 307 is configured to direct the optical beam 304, because of its polarization, toward the optical scanner 301. Optical scanner 301 is configured to scan a target environment with the optical beam 304, through a range of azimuth and elevation angles covering the field of view (FOV) 310 of a LIDAR window 311 in an enclosure 320 of the optical system 350. In FIG. 3B, for ease of illustration, only the azimuth scan is illustrated.

As shown in FIG. 3B, at one azimuth angle (or range of angles), the optical beam 304 passes through the LIDAR window 311 and illuminates a target 312. A return signal 313 from the target 312 passes through LIDAR window 311 and is directed by optical scanner 301 back to the PBS 307.

The return signal 313, which will have a different polarization than the optical beam 304 due to reflection from the target 312, is directed by the PBS 307 to the photodetector (PD) 309. In PD 309, the return signal 313 is optically mixed with the local sample 308 of the optical beam 304 to generate a baseband electrical signal 314 (e.g., beat signal) with a frequency that is proportional to the range of the scanned target. The baseband electrical signal 314 may be generated by the frequency difference between the local sample 308 of the optical beam 304 and the return signal 313 versus time (i.e., $\Delta f_R(t)$).

Figure 4:
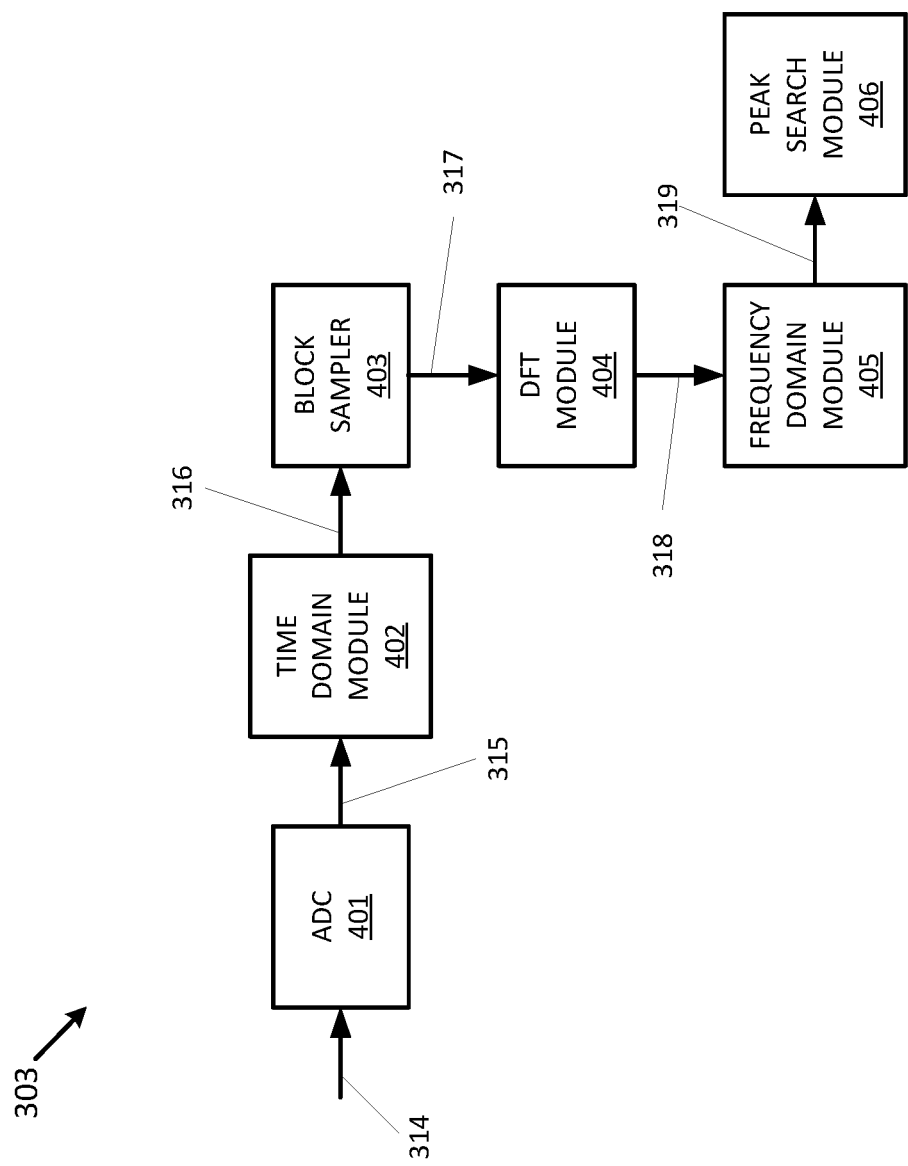
FIG. 4 is a block diagram of an example signal processing system according to the present disclosure.

FIG. 4 is a detailed block diagram illustrating an example of the signal processing system 303 of FIG. 3A, which processes the baseband electrical signal 314, according to some embodiments. As noted above, signal processing unit 303 may include elements of signal conversion unit 106, signal conditioning unit 107, LIDAR control systems 110 and signal processing unit 112 in LIDAR system 100.

According to some embodiments, signal processing system 303 includes an analog-to-digital converter (ADC) 401, a time domain signal processor 402, a block sampler 403, a discrete Fourier transform processor 404, a frequency domain signal processor 405, and a peak search processor 406. The component blocks of signal processing system 303 may be implemented in hardware, firmware, software, or some combination of hardware, firmware and software.

In FIG. 4, the baseband electrical signal 314, which is a continuous analog signal in the time domain, is sampled by ADC 401 to generate a series of time domain samples 315. The time domain samples 315 are processed by the time domain module 402, which conditions the time domain samples 315 for further processing. For example, time domain module 402 may apply weighting or filtering to remove unwanted signal artifacts or to render the signal more tractable for subsequent processing. The output 316 of time domain module 402 is provided to block sampler 403. Block sampler 403 groups the time domain samples 316 into groups of N samples 317 (where N is an integer greater than 1), which are provided to DFT module 404. DFT module 404 transforms the groups of N time domain samples 317 into N frequency bins or subbands (e.g., subband signal spectrum 318) in the frequency domain, covering the bandwidth of the baseband electrical signal 314. The N subband signal spectrum 318 is provided to frequency domain module 405, which conditions the subbands for further processing. For example, frequency domain module 405 may resample and/or average the subband signal spectrum 318 for noise reduction. Frequency domain module 405 may also calculate signal statistics and system noise statistics. The processed subband signal spectrum 319 is then provided to a peak search module 406 that searches for signal peaks representing detected targets in the FOV of the LIDAR system 300.

In some embodiments, the subband signal spectrum 319 provided to the peak search module 406 is the sum of the energy in the target return 313 and all of the noise contributed by the LIDAR system 300 as the target return signal is processed. In some scenarios, electronic systems have sources of noise that limit the performance of those systems by creating a noise floor, which is the combined level of all sources of noise in the system. In order to be detected, a signal in an electronic system such as the subband signal spectrum 319, developed from the baseband electrical signal 314, must be above the noise floor absent specialized signal processing techniques such as signal integration and noise averaging.

Sources of noise in a LIDAR system, such as LIDAR system 300, may include thermal noise, 1/f noise, shot noise, impulse noise, RIN (relative intensity noise associated with lasers), TIA (trans-impedance amplifier) noise, and ADC (analog-to-digital conversion) noise. System noise may be characterized, for example, by its energy versus frequency profile across frequency bins, by its first moments (mean) across the frequency bins, by its second moments (variance) across the frequency bins, by its third moment (asymmetry) across the frequency bins, and/or by its fourth moment (kurtosis, or the sharpness of peaks) across the frequency bins of the frequency spectrum.

Figure 5A:
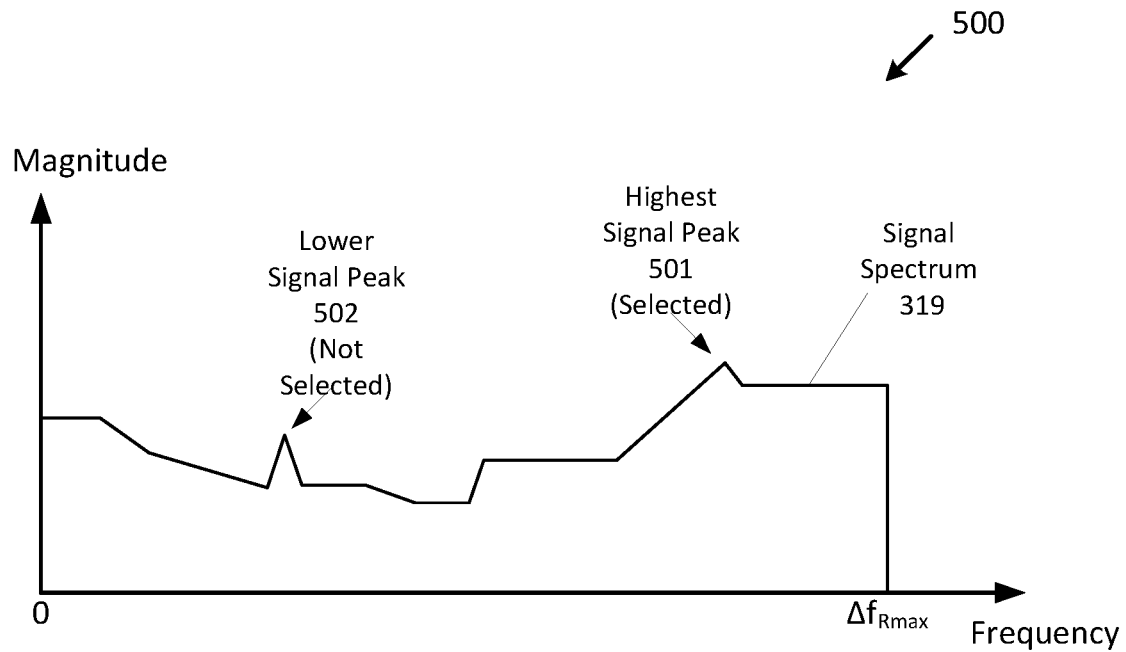
FIG. 5A is a signal magnitude-frequency diagram illustrating an example method of peak detection according to the present disclosure.

FIG. 5A is a diagram 500 illustrating magnitude versus frequency of the subband signal spectrum 319 that includes system noise, shown as a continuous waveform (rather than as discrete frequency bins or subbands) for ease of illustration. Diagram 500 may be generated and/or used by signal processing system 303 of FIG. 3 and peak search module 406 of FIG. 4 to detect a signal peak corresponding to a target detection. Additionally, diagram 500 may be generated and/or used by one or more of the elements of LIDAR system 100 of FIG. 1 (e.g., signal conversion unit 106, signal conditioning unit 107, LIDAR control systems 110 and signal processing unit 112). The frequencies span the range from 0 to $\Delta f_{R_{max}}$. In some scenarios, without more information about the subband signal spectrum 319, the peak search module 406 would select the highest signal peak 501 as the return signal that most likely indicates the presence of a target, and not select a lower signal peak 502, for example. However, using a calculated estimate of system noise, the peak search module 406 can be configured to compare the subband signal spectrum 319 to the system noise estimate and could make a more informed selection based on additional selection criteria (e.g., a likelihood metric).

Figure 5B:
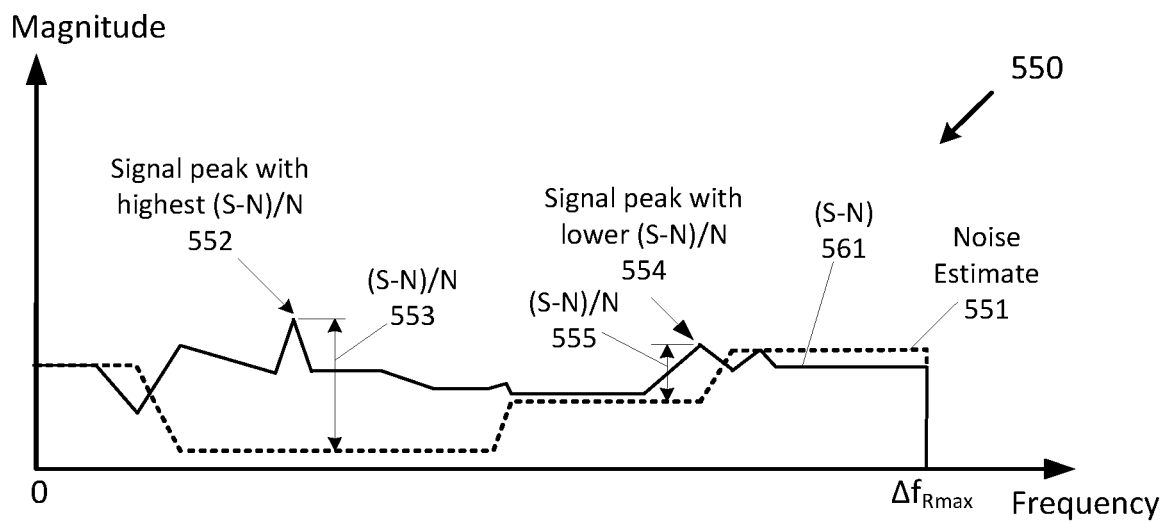
FIG. 5B is a signal magnitude-frequency diagram illustrating a noise estimate compared to a difference between a signal spectrum and the noise estimate according to the present disclosure.

In FIGS. 5A and 5B, signal and noise values are depicted as energy (e.g., intensity) versus frequency contours. However, as previously noted with respect to FIG. 4, the system noise may be additionally characterized by any of its first through fourth moments representing mean energy, energy variance, energy asymmetry and kurtosis versus frequency, respectively. In addition to energy alone, the signal may be characterized in terms of autocorrelation statistics across the frequency bins in the baseband and/or cross-correlation statistics between the signal and the system noise estimate across the frequency bins.

In one example, an estimate of system noise can be obtained by operating a LIDAR system, such as LIDAR system 300, in an anechoic (no-echo) calibration mode where there is no detectable return signal (e.g., return signal 313). This mode of operation generates all of the normal system noise mechanisms and results in a subband signal spectrum that includes energy only from the system noise sources. Accordingly, one or more likelihood metrics for a subband signal spectrum 319 can be generated based on the system noise and any other parameters of the LIDAR system or signal spectrum 319, such as known target reflectivity, internal reflections, known internal and external noise sources, known target locations, and so forth.

FIG. 5B is an energy versus frequency diagram 550 comparing a noise estimate 551 (e.g., the noise estimate as determined in the anechoic (no-echo) calibration mode described above) to the difference between the subband signal spectrum 319 and the noise estimate 551, diagrammed in FIG. 5B as signal minus noise (S−N) 561. In some embodiments, the signal processing system 303 may be configured to use the subband signal (e.g., subband signal spectrum 319) and the system noise estimate (e.g., system noise estimate 651) to generate one or more likelihood metrics (e.g., (S−N)/N, SNR, etc.) used to determine the likelihood that a signal peak in the frequency domain indicates a detected target and to decrease the likelihood that a signal peak in the frequency domain from a false target will be interpreted as a real target. Such likelihood metrics may be used for both detection thresholding and peak selection.

In the example of FIG. 5B, the peak search module 406 may be configured to select the signal peak with respect to one of the determined likelihood metrics. For example, the likelihood metric may be a signal minus noise to noise ratio ("(S−N)/N"). The peak search module 406 may thus select the highest non-negative signal minus noise to noise ratio (S−N)/N). Under this selection criteria, signal peak 552 with (S−N)/N 553 would be selected over signal peak 554 with (S−N)/N 555 because (S−N)/N 553 is larger than (S−N)/N 555. In another example, the peak search module 406 may use the likelihood metric of signal minus noise ("S−N") for peak selection in which case peak 552 would still be selected over peak 554. Any other likelihood metric may also be used to select a peak, such as SNR, raw intensity (e.g., signal 319), or other metric generated based on the LIDAR system and the subband signal spectrum 319.

Figure 6A:
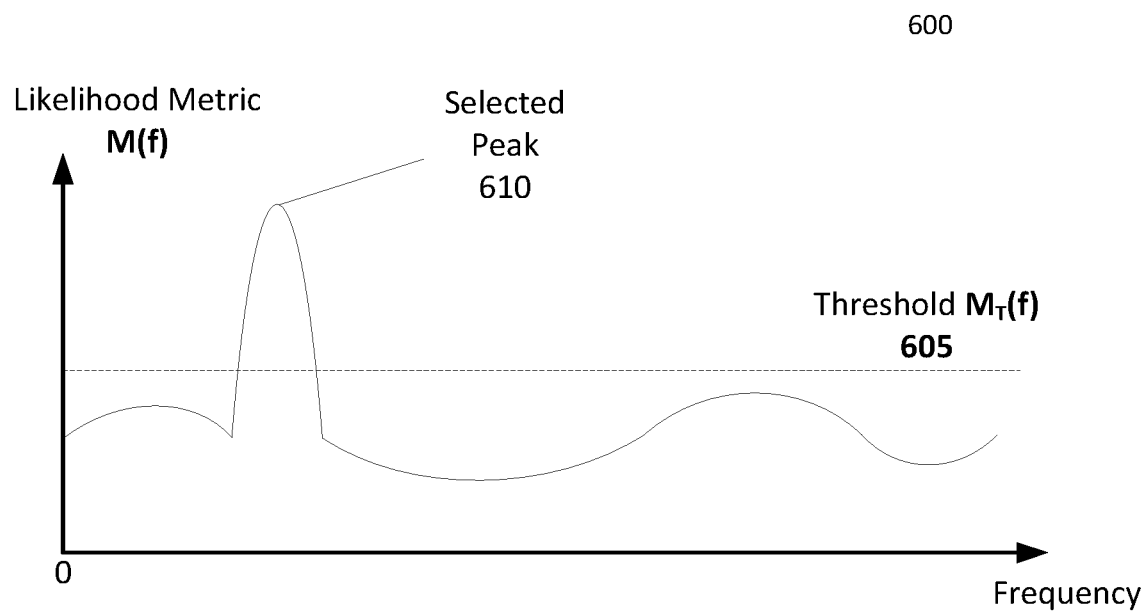
FIG. 6A is a likelihood metric-frequency diagram illustrating an example of peak detection using a likelihood metric for thresholding and peak selection, according to the present disclosure.
Figure 6B:
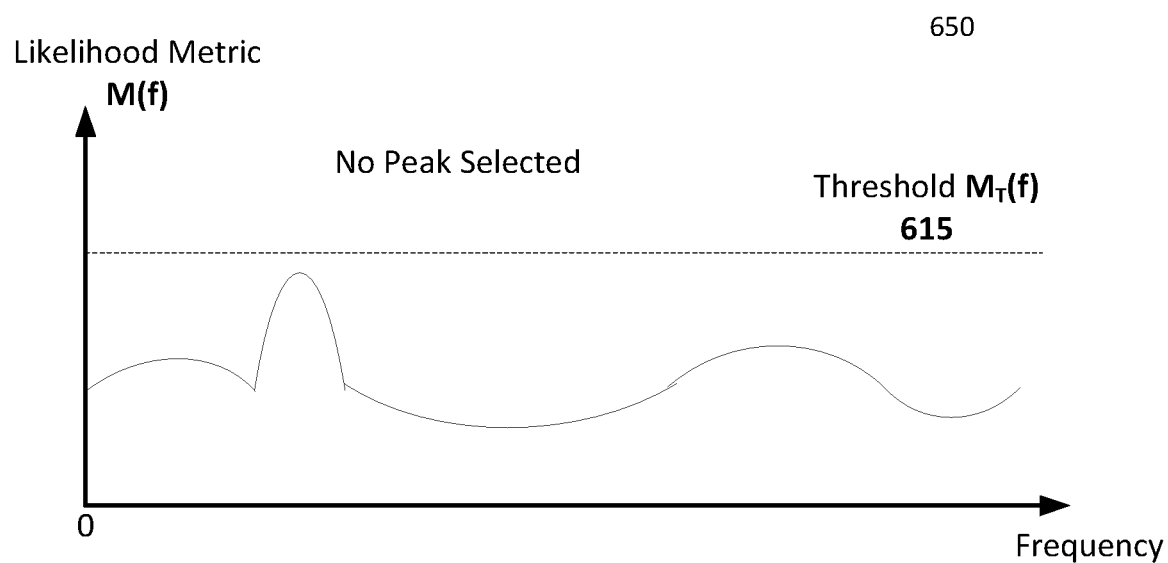
FIG. 6B is a likelihood metric-frequency diagram illustrating another example of peak detection using a likelihood metric for thresholding and peak selection in which no peak is selected, according to the present disclosure.

FIGS. 6A and 6B depict likelihood metric-frequency diagrams 600 and 650 illustrating examples of using a single likelihood metric for thresholding and peak selection. Diagrams 600 and 650 may be generated and/or used by signal processing system 303 of FIG. 3 or peak search module 406 of FIG. 4. Additionally, diagrams 600 and 650 may be generated and/or used by one or more of the elements of LIDAR system 100 of FIG. 1 (e.g., signal conversion unit 106, signal conditioning unit 107, LIDAR control systems 110 and signal processing unit 112).

As discussed above, the signal processing system 303 of FIGS. 3A and 4 may generate a waveform in a frequency domain in which each frequency has an associated energy value (e.g., intensity). The signal processing system 303 (e.g., via peak search module 406) may generate one or more likelihood metrics for each frequency in a spectrum of frequencies (e.g., subband frequency spectrum 319) based on the energy values. A likelihood metric may be a metric generated for each of the frequencies in the spectrum to maximize the likelihood of selecting a peak corresponding to an actual target detection while reducing the likelihood of false alarm detection (e.g., due to noise). For example, the likelihood metric may be a signal-to-noise ratio (SNR), intensity, signal-minus-noise, signal-minus-noise to noise ratio, etc., as described above with respect to FIGS. 5A-B. Whatever likelihood metric is selected, a peak search module (e.g., peak search module 406 of FIG. 4.) may select the frequency, or frequency bin, in the spectrum that has the highest value (e.g., the highest peak) with respect to the likelihood metric and that also exceeds a threshold value for the likelihood metric.

As depicted in FIG. 6A, a threshold $M_T(f)$ 605 for the likelihood metric $M(f)$ may be set at a single threshold value across all the frequencies in the spectrum of frequencies. The likelihood metric $M(f)$ may be set at a value to maximize probability of target detection while minimizing the number of false alarm detections (i.e., detections that are not actual targets). In another example, the threshold 605 may vary across the frequencies of the spectrum. For example, the threshold 605 may be adjusted for frequencies corresponding to previously detected targets or interferers. According to the depicted example, the selected peak 610 may be selected because it is both the highest peak in the diagram with respect to the likelihood metric $M(f)$ and also exceeds the threshold $M_T(f)$ 605. Thus, the selected peak 610 is selected as the frequency associated with a target detection. The frequency of the selected peak 610 can then be used to calculate properties of the target such as distance to the target and velocity of the target. In one embodiment the peak may be selected based on the following equation: $P = \arg\max_f M(f)$ subject to $M(f) \geq M_T(f)$. In other words, the frequency corresponding to the maximum value for the likelihood metric $M(f)$ is selected for which the likelihood metric $M(f)$ also is equal to or greater than the threshold at that frequency.

In the example depicted by FIG. 6B, the threshold $M_T(f)$ 615 is set at a value that none of the frequencies of the spectrum exceed with respect to the likelihood metric $M(f)$. Accordingly, none of the peaks in the diagram 650 will result in a peak detection. In one example, the peak selection algorithm may first apply the threshold $M_T(f)$ to the diagram to determine if any of the frequencies exceed the threshold for the likelihood metric $M(f)$. The peak selection algorithm may then select a peak from the frequencies that exceed the threshold. In another example, the peak selection algorithm may first select the highest peak with respect to the likelihood metric $M(f)$ and then apply the threshold $M_T(f)$ to determine if the selected peak exceeds the threshold $M_T(f)$. Therefore, only the highest peak that is also above the threshold is selected and used for target detection. Thus, as depicted in diagram 650 of FIG. 6B, after the highest peak is initially selected, the peak will not be used for target detection if it does not exceed the threshold $M_T(f)$ 615.

Figure 7:
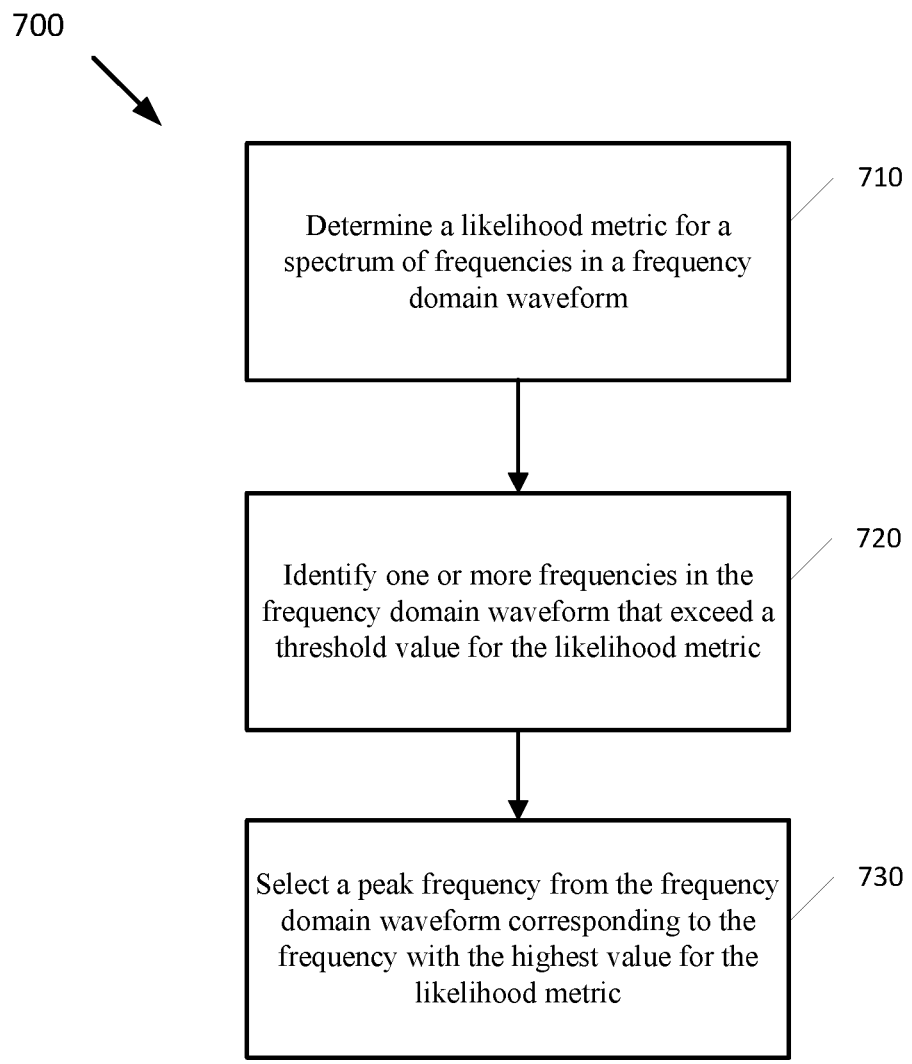
FIG. 7 is a flowchart illustrating a method of peak detection using a single likelihood metric for thresholding and peak selection according to the present disclosure

FIG. 7 flowchart illustrating a method 700 of peak detection using a single likelihood metric for thresholding and peak selection in a LIDAR system, such as LIDAR system 100 or LIDAR system 300. Method 700 may be performed by one or more of the elements of LIDAR system 100 of FIG. 1 (e.g., signal conversion unit 106, signal conditioning unit 107, LIDAR control systems 110 and signal processing unit 112) and/or peak search module 406 of FIG. 4.

Method 700 begins at operation 710, where processing logic (e.g., peak search module 406) determines a likelihood metric for a spectrum of frequencies in a frequency domain waveform (e.g., subband signal spectrum 319). The likelihood metric may be an intensity, an SNR, a signal minus noise to noise ratio ((S−N)/N), or any other likelihood ratio used to increase target detections and reduce false alarm detections.

At operation 720, the processing logic (e.g., peak search module 406) identifies one or more frequencies in the frequency domain waveform that exceed a threshold value for the likelihood metric. In one example, the processing logic may filter out the frequencies with a value for the likelihood metric that is below the threshold value. Thus, the remaining frequencies with a value for the likelihood metric that exceed the threshold value may remain and be used at operation 730 for peak selection.

At operation 730, the processing logic selects a peak frequency from the frequency domain waveform corresponding to the frequency with the highest value for the likelihood metric, as depicted in FIG. 6B. In one example, the same likelihood metric is used for thresholding at operation 720 and for peak selection at operation 730. In some embodiments, the processing logic may perform the thresholding of operation 720 prior to performing the peak selection of operation 730. In such embodiments, the peak frequency may be selected from the frequencies remaining after thresholding. In alternative embodiments, the processing logic may first select a peak at operation 730 and then perform the thresholding of operation 720 to determine whether the selected peak exceeds the threshold. If the selected peak exceeds the threshold, the peak is selected for use in target detection. If the selected peak does not exceed the threshold, then no peak is selected from the current frequency domain waveform. Thus, no target would be detected during the processing of the frequencies included in the particular time domain being processed.

Figure 8A:
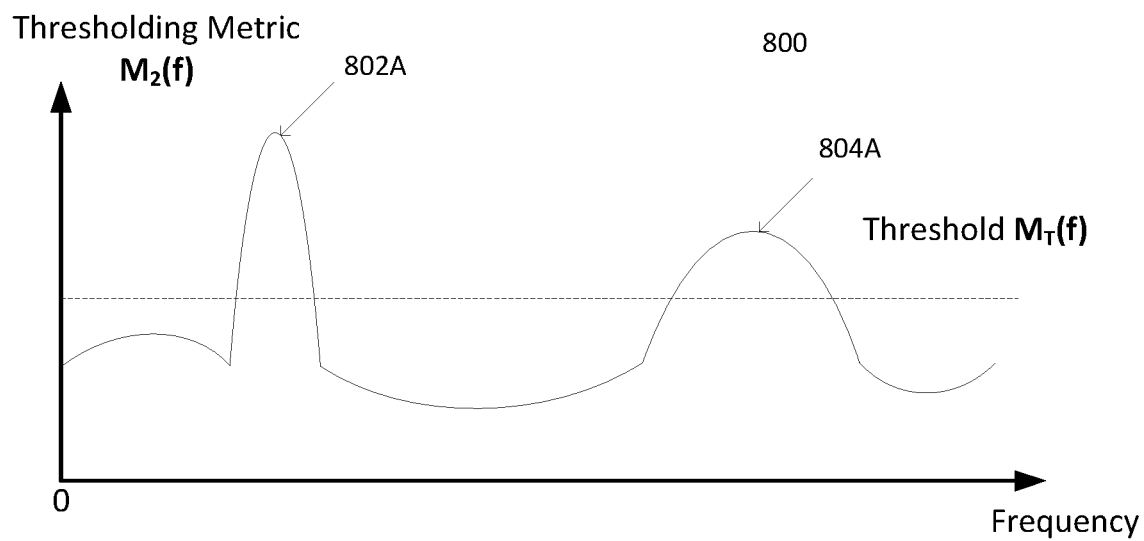
FIG. 8A is a thresholding metric-frequency diagram illustrating an example of peak thresholding using a thresholding metric different from a peak selection metric, according to the present disclosure.
Figure 8B:
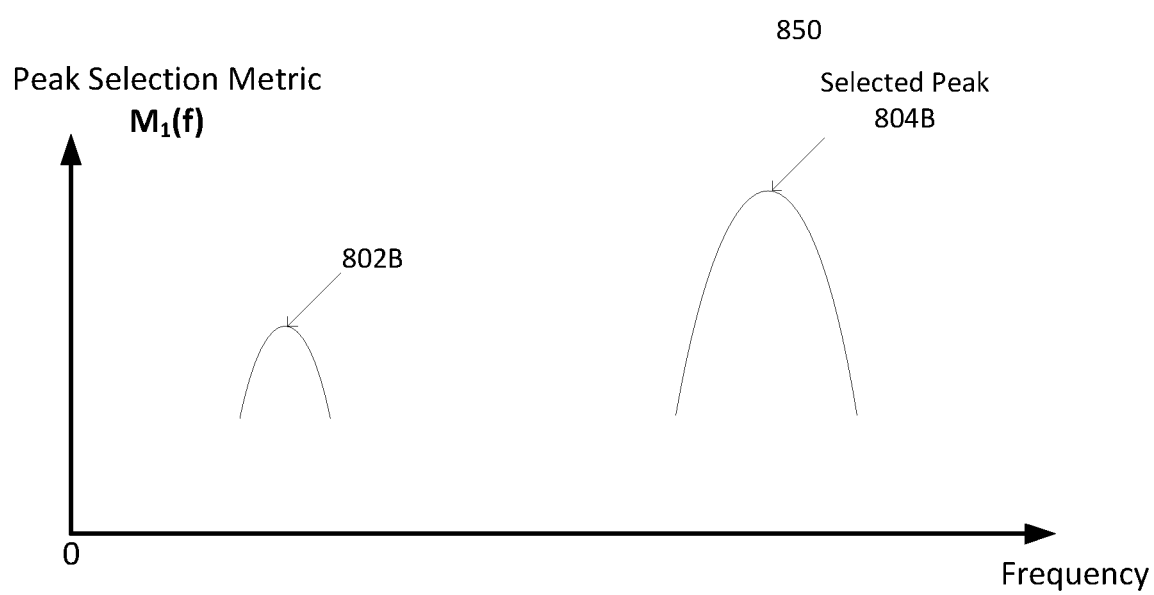
FIG. 8B is a peak selection metric-frequency diagram illustrating an example of peak selection using a peak selection metric different from a thresholding metric, according to the present disclosure.

FIGS. 8A and 8B depict metric-frequency diagrams 800 and 850 illustrating an example method of peak detection using a first likelihood metric for thresholding and a second different likelihood metric for performing peak selection. Diagrams 800 and 850 may be generated and/or used by signal processing system 303 of FIG. 3 or peak search module 406 of FIG. 4. Additionally, diagrams 800 and 850 may be generated and/or used by one or more of the elements of LIDAR system 100 of FIG. 1 (e.g., signal conversion unit 106, signal conditioning unit 107, LIDAR control systems 110 and signal processing unit 112).

In some embodiments, a peak search module may first perform a thresholding operation on the frequencies in the waveform to filter out any frequencies that are below a threshold value for a thresholding metric. The thresholding metric may be intensity, SNR, or any other likelihood metric. The peak search module may then determine a different likelihood metric to perform peak selection on the remaining frequencies that were not filtered out by the thresholding operation. The frequency of the remaining frequencies that has the highest value for the peak selection metric is selected for target detection.

As depicted in diagram 800 of FIG. 8A, the frequencies in the frequency domain waveform that are less than the threshold $M_T(f)$ 805 are filtered out. However, the peak is not selected using the thresholding metric $M_2(f)$. Instead, a peak signal frequency may be selected based on the peak selection metric $M_1(f)$, as shown in diagram 850 of FIG. 8B, which may be a different metric than the thresholding metric $M_2(f)$. For example, peak 802A and 804A may each include frequencies with signals that have a value for the thresholding metric $M_2(f)$ that is above the threshold $M_T(f)$. Therefore, the frequencies of the frequency spectrum corresponding to peak 802A and 804A may be used for peak selection. However, the peak selection metric $M_1(f)$ may be determined for the frequencies corresponding to peaks 802A and 804A. For example, the peak 802B with respect to the peak selection metric $M_1(f)$ may correspond to the frequencies of peak 802A with respect to the thresholding metric $M_2(f)$. Similarly, the selected peak 804B with respect to the peak selection metric $M_1(f)$ may correspond to the frequencies of 804A with respect to the thresholding metric $M_2(f)$. Therefore, although peak 802A may be the highest peak for the thresholding metric $M_2(f)$, peak 804B is the highest peak with respect to the peak selection metric $M_1(f)$ for the remaining frequencies that were not filtered out during thresholding. Accordingly, peak 804B would be selected for peak detection. Thus, the highest peak with respect to the thresholding metric $M_2(f)$ may not be the resulting selected peak with respect to the peak selection metric $M_1(f)$.

In one embodiment, the peak thresholding and selection using different likelihood metrics may be represented by the following equation: $P = \arg\max_f M_1(f)$ subject to $M_2(f) \geq M_T(f)$. In other words, the peak that has the maximum value for the peak selection metric $M1(f)$ is selected that also has a value of the thresholding metric $M2(f)$ that is greater than or equal to the threshold at that frequency. In another embodiment, different peak selection metrics may be defined based on different thresholds. For example, if no peaks exceed the initial threshold $MT(f)$ then a lower threshold may be selected and a different peak selection metric used for peak selection. In some embodiments, the additional threshold values and peak selection metric may be represented by the following equation: $P = \arg\max_f M_1(f)$ subject to $M_2(f) \geq M_T(f)$, however if there are no f such that $M2(f) \geq M_T(f)$, then $P = \arg\max_f M_3(f)$ subject to $M_T(f) \geq M_{T'}(f)$ where $MT(f) \geq M_{T'}(f)$. This may be generalized for any number of thresholds and any number of additional likelihood metrics.

Figure 9:
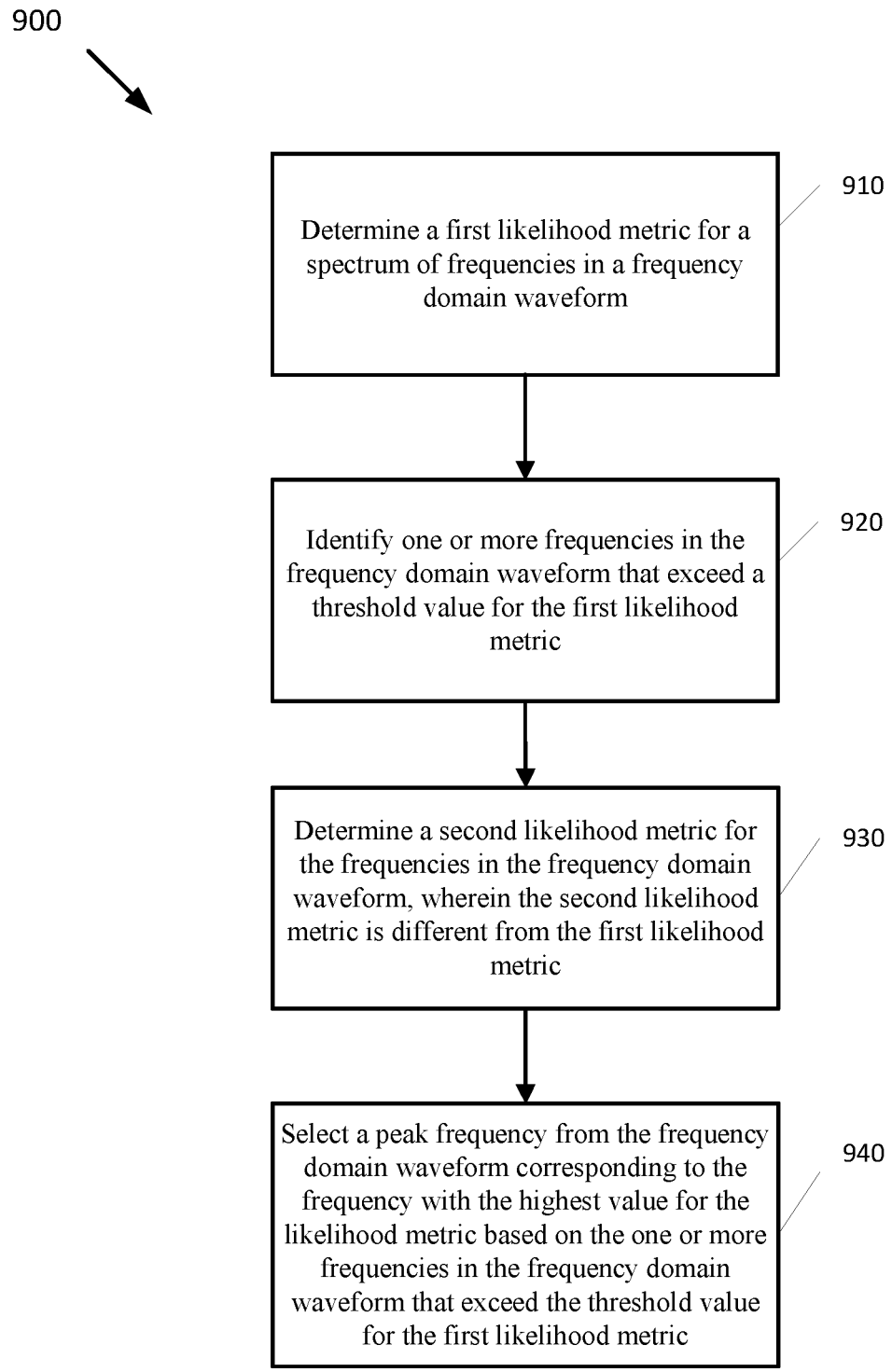
FIG. 9 is a flowchart illustrating a method of peak detection using different likelihood metrics for thresholding and peak selection, according to the present disclosure.

FIG. 9 flowchart illustrating a method 900 of peak detection using different likelihood metrics for thresholding and peak selection in a LIDAR system, such as LIDAR system 100 or LIDAR system 300. Method 700 may be performed by one or more of the elements of LIDAR system 100 of FIG. 1 (e.g., signal conversion unit 106, signal conditioning unit 107, LIDAR control systems 110 and signal processing unit 112) and/or peak search module 406 of FIG. 4.

Method 900 begins at operation 910, where processing logic (e.g., peak search module 406) determines a first likelihood metric for a spectrum of frequencies in a frequency domain waveform. The first likelihood metric may be signal-to-noise ratio (SNR), intensity, signal-minus-noise, signal-minus-noise to noise ratio, or any other likelihood metric determined for the spectrum of signal frequencies. The first likelihood metric may be used for detection thresholding to filter out signals that correspond to noise and to bias peak detection for actual targets based on known information about the targets. For example, if targets of interest for the LIDAR system have a known minimum reflectivity then the first likelihood metric may be selected as intensity and a threshold value selected so that any noise that is below the minimum reflectivity are filtered out from peak selection (e.g., because it is known that targets should have an intensity above the threshold). In another example, if the LIDAR system has large variations in the estimated noise level then the first likelihood metric may be selected as SNR to filter out peaks corresponding to noise events.

At operation 920, the processing logic (e.g., peak search module 406) identifies one or more frequencies in the frequency domain waveform that exceed a threshold value for the first likelihood metric. In one example, the processing logic may filter out any frequencies that do not exceed the threshold value. In another example, the processing logic may select each of the frequencies that are equal to or exceed the threshold value. Thus, the remaining frequencies are the frequencies that are equal to or exceed the threshold value with respect to the first likelihood metric.

At operation 930, the processing logic (e.g., peak search module 406) determines a second likelihood metric for the spectrum of frequencies in the frequency domain waveform. Similar to the first likelihood metric, the second likelihood metric may be signal-to-noise ratio (SNR), intensity, signal-minus-noise, signal-minus-noise to noise ratio, or any other likelihood metric. However, depending on the selection for the first likelihood metric, the second likelihood metric may be selected to be a different likelihood metric than the first likelihood metric. For example, if the first likelihood metric is selected to be intensity then the second likelihood metric may be selected as SNR. Alternatively, if the first likelihood metric is selected as SNR then the second likelihood metric may be selected as intensity.

At operation 940, the processing logic (e.g., peak search module 406) selects a peak signal frequency from the frequency domain waveform corresponding to the frequency with the highest value for the second likelihood metric based on the one or more frequencies in the frequency domain waveform that exceed the threshold value for the first likelihood metric. Accordingly, the peak frequency is selected from the frequencies that were either selected, or not filtered out, during detection thresholding (operation 920). Because a different likelihood metric is used for peak detection than was used for thresholding, any biases that may be present in the first likelihood metric may be offset by the second likelihood metric. Accordingly, using two separate likelihood metrics for thresholding and peak selection may increase the probability of proper target detections and reduce false alarms.

Figure 10:
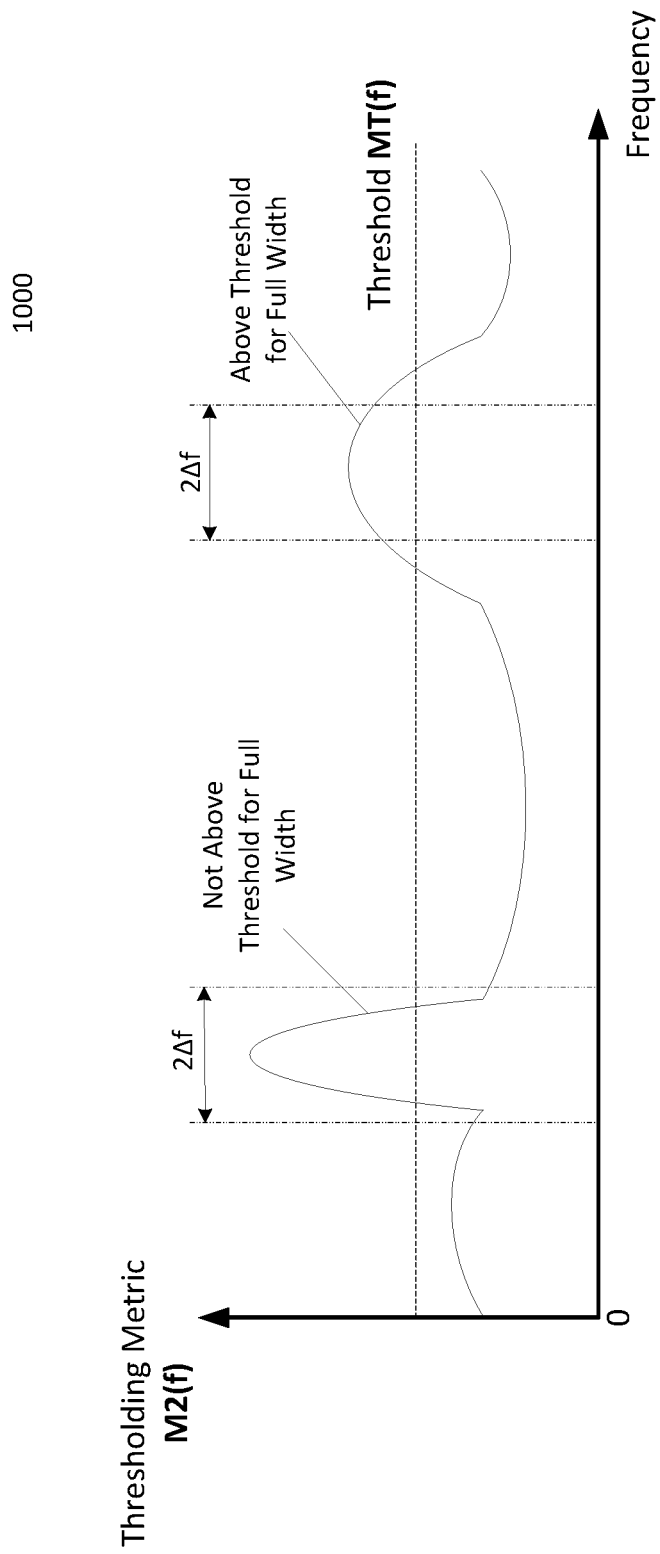
FIG. 10 is a thresholding metric-frequency diagram illustrating an example of peak detection using a thresholding metric and a minimum peak width, according to the present disclosure.

FIG. 10 depicts a metric-frequency diagram 1000 illustrating an example method of peak detection using thresholding of peaks with minimum threshold widths. Diagram 1000 may be generated and/or used by signal processing system 303 of FIG. 3 or peak search module 406 of FIG. 4.

Additionally, diagram 1000 may be generated and/or used by one or more of the elements of LIDAR system 100 of FIG. 1 (e.g., signal conversion unit 106, signal conditioning unit 107, LIDAR control systems 110 and signal processing unit 112).

In some embodiments, during the thresholding operation as described above with respect to FIGS. 6A and 8A, an additional constraint of peak width may be added to filter out uncorrelated peaks (e.g., peaks with small widths that are likely to be noise events). For example, as depicted in diagram 1000 of FIG. 10, the peak search module may include a minimum peak width that exceeds a threshold $M_T(f)$ for a thresholding metric $M_2(f)$.

In one example, the peak search module may first identify a peak that exceeds the threshold $M_T(f)$ value for the thresholding metric $M_2(f)$. The peak search module may then determine if additional frequencies adjacent to the identified peak are also above the threshold $M_T(f)$. For example, the peak search module may determine whether a particular range of frequencies Δf (e.g., a certain number of frequency bins) on either side of the identified peak. Accordingly, the identified peak may be filtered from the peak selection unless the peak has a minimum width of 2Δf that exceeds the threshold $M_T(f)$, where f is an arbitrary frequency range or number of frequency bins. As described above with respect to FIGS. 6B and 8B, the peak search module may then select a peak from the remaining frequencies that were not filtered out during thresholding (i.e., that exceed the threshold with the minimum width). The addition of multi-frequency bin thresholding may be represented by the following equation: P=arg $max_f M_1(f)$ subject to $M_2(f') \geq M_T(f')$, and f' includes the set [f−Δf, f+Δf]. In other words, a band [f−Δf, f+Δf] around the peak needs to be above the threshold $M_T(f)$.

Figure 11:
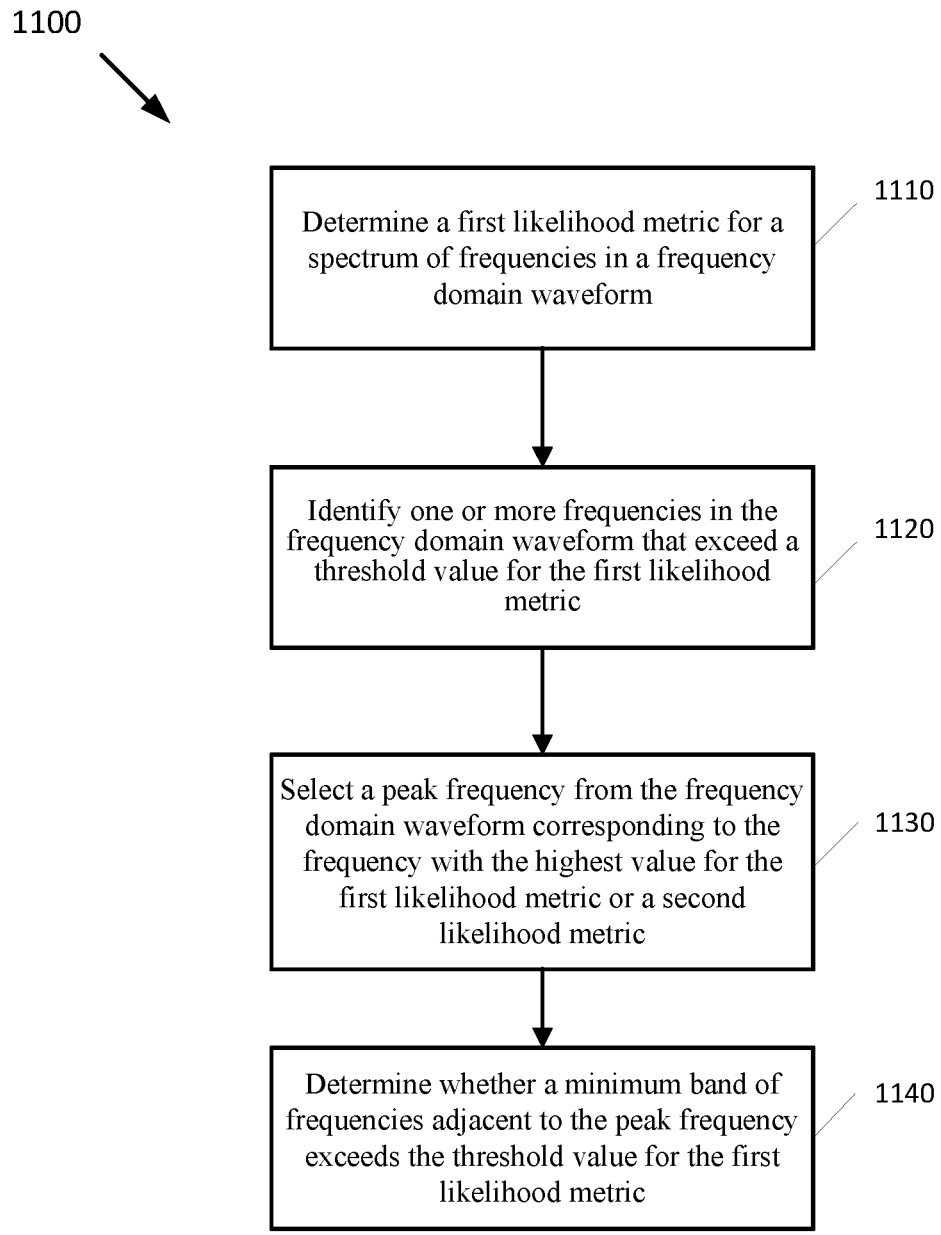
FIG. 11 is a flowchart illustrating a method of peak detection using thresholding with a minimum peak width, according to the present disclosure

FIG. 11 flowchart illustrating a method 1100 of peak detection using thresholding with a minimum peak width in a LIDAR system, such as LIDAR system 100 or LIDAR system 300. Method 1100 may be performed by one or more of the elements of LIDAR system 100 of FIG. 1 (e.g., signal conversion unit 106, signal conditioning unit 107, LIDAR control systems 110 and signal processing unit 112) and/or peak search module 406 of FIG. 4.

Method 1100 begins at operation 1110, where processing logic (e.g., peak search module 406) determines a first likelihood metric for frequencies in a frequency domain waveform. The likelihood metric may be an intensity, an SNR, a signal minus noise to noise ratio ((S−N)/N), or any other likelihood ratio used to increase target detections and reduce false alarm detections as described herein.

At operation 1120, the processing logic (e.g., peak search module 406) identifies one or more frequencies in the frequency domain waveform that exceed a threshold value for the first likelihood metric. In one example, the processing logic may filter out any frequencies that do not exceed the threshold value. In another example, the processing logic may select each of the frequencies that are equal to or exceed the threshold value. Thus, the remaining frequencies are the frequencies that are equal to or exceed the threshold value with respect to the first likelihood metric.

At operation 1130, the processing logic (e.g., peak search module 406) selects a peak frequency from the frequency domain waveform corresponding to the frequency with the highest value for the first likelihood metric or a second likelihood metric. In one example, the same first likelihood metric may be used to select the peak. In another example, a second likelihood metric, different from the first likelihood metric, may be used for peak selection.

At operation 1140, the processing logic (e.g., peak search module 406) determines whether a minimum band of frequencies adjacent to the peak frequency exceeds the threshold value for the first likelihood metric. In other words, the processing logic determines whether the width of the selected peak exceeds a threshold width. In one embodiment, the processing logic determines whether the width of the portion of the peak that exceeds the threshold is wider than a minimum width. If the band of frequencies corresponding to the peak has a width larger than the minimum width, the peak is selected for target detection. Otherwise, if the peak has a width less than the minimum width the peak is not selected. In some embodiments, a wider peak may be correlated with a detected target while a narrow peak may be correlated with a noise event. Thus, only selecting peaks that exceed a particular width may reduce false alarm detections.

Figure 12:
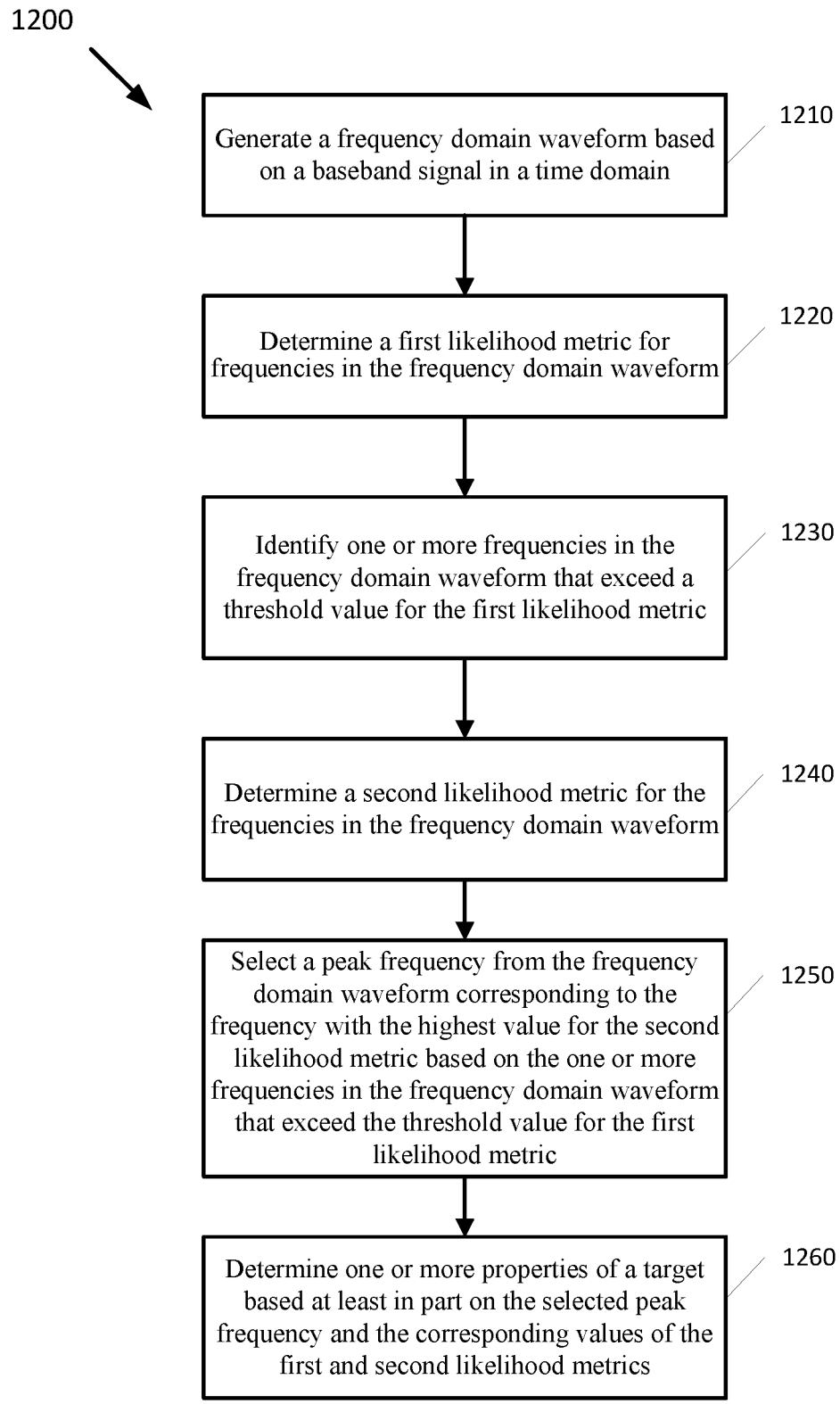
FIG. 12 is a flowchart illustrating a method for peak detection according to the present disclosure.

FIG. 12 is a flowchart illustrating a method 1200 of peak detection in a LIDAR system, such as LIDAR system 100 or LIDAR system 300. Method 1200 may be performed by one or more of the elements of LIDAR system 100 of FIG. 1 (e.g., signal conversion unit 106, signal conditioning unit 107, LIDAR control systems 110 and signal processing unit 112) and/or peak search module 406 of FIG. 4.

Method 1200 begins at operation 1210, where processing logic (e.g., peak search module 406) generates a frequency domain waveform based on a baseband signal in a time domain. As described above with respect to FIG. 2 and FIG. 5A, the baseband signal in the time domain may be an analog electrical signal detected over a certain period of time including frequencies that correspond to target distances. The baseband signal in the time domain may be converted into a frequency domain representing a magnitude (e.g., intensity) associated with each frequency, or frequency bin (e.g., subband of frequencies). Thus, a frequency domain waveform may be generated across a frequency spectrum represented as a waveform with one or more peaks. Peaks in the waveform may correspond to a target detection or may be a noise event. The processing logic may generate one or more likelihood metrics for the frequencies in the frequency spectrum and perform thresholding and/or peak detection based on the frequency domain waveform and the likelihood metrics generated from the frequency domain waveform.

At operation 1220, the processing logic (e.g., peak search module 406) determines a first likelihood metric for frequencies in the frequency domain waveform. The first likelihood metric may be intensity, an SNR, a signal minus noise to noise ratio ((S−N)/N), or any other likelihood ratio or metric. At operation 1230, the processing logic (e.g., peak search module 406) identifies one or more frequencies in the frequency domain waveform that exceed a threshold value for the first likelihood metric.

At operation 1240, the processing logic (e.g., peak search module 406) determines a second likelihood metric for the frequencies in the frequency domain waveform. In one embodiment, the first likelihood metric is the same as the second likelihood metric. In another embodiment, the first likelihood metric is different from the second likelihood metric. The second likelihood metric may be intensity, an SNR, a signal minus noise to noise ratio ((S−N)/N), or any other likelihood ratio or metric. In some embodiments, the first likelihood metric and the second likelihood metric are selected based on previously collected information associated with the target. For example, if the likelihood metrics may be selected based on known properties, such as reflectivity of targets of interest, noise properties of the LIDAR system, etc.

At operation 1250, the processing logic (e.g., peak search module 406) selects a peak frequency from the frequency domain waveform corresponding to the frequency with the highest value for the second likelihood metric based on the one or more frequencies in the frequency domain waveform that exceed the threshold value for the first likelihood metric. The processing logic may further determine whether the peak frequency includes a band of frequencies exceeding the threshold value. The processing logic may further determine whether the band of frequencies exceeding the threshold value has a width larger than a minimum threshold width. In some embodiments, selecting a peak frequency from the frequency domain waveform corresponding to the frequency with the highest value for the second likelihood metric includes selecting the peak frequency from the one or more frequencies in the frequency domain waveform that exceed the threshold value for the first likelihood metric.

In some embodiments, in response to determining that there are no frequencies in the frequency domain waveform that exceed the threshold value for the first likelihood metric, the processing logic determines a third confidence metric for the frequencies in the frequency domain waveform and a second threshold value for the first likelihood metric, identifies one or more frequencies in the frequency domain waveform that exceed the second threshold value for the first likelihood metric, and selects the peak frequency from the one or more frequencies exceeding the second threshold value, the peak frequency corresponding to the highest value for the third likelihood metric. At operation 1260, the processing logic (e.g., peak search module 406) determines one or more properties of a target based at least in part on the selected peak frequency and the corresponding values of the first and second likelihood metrics. The one or more properties may include a position or distance (e.g., range) of the target, a velocity of the target, and/or a reflectivity of the target.

Figure 13:
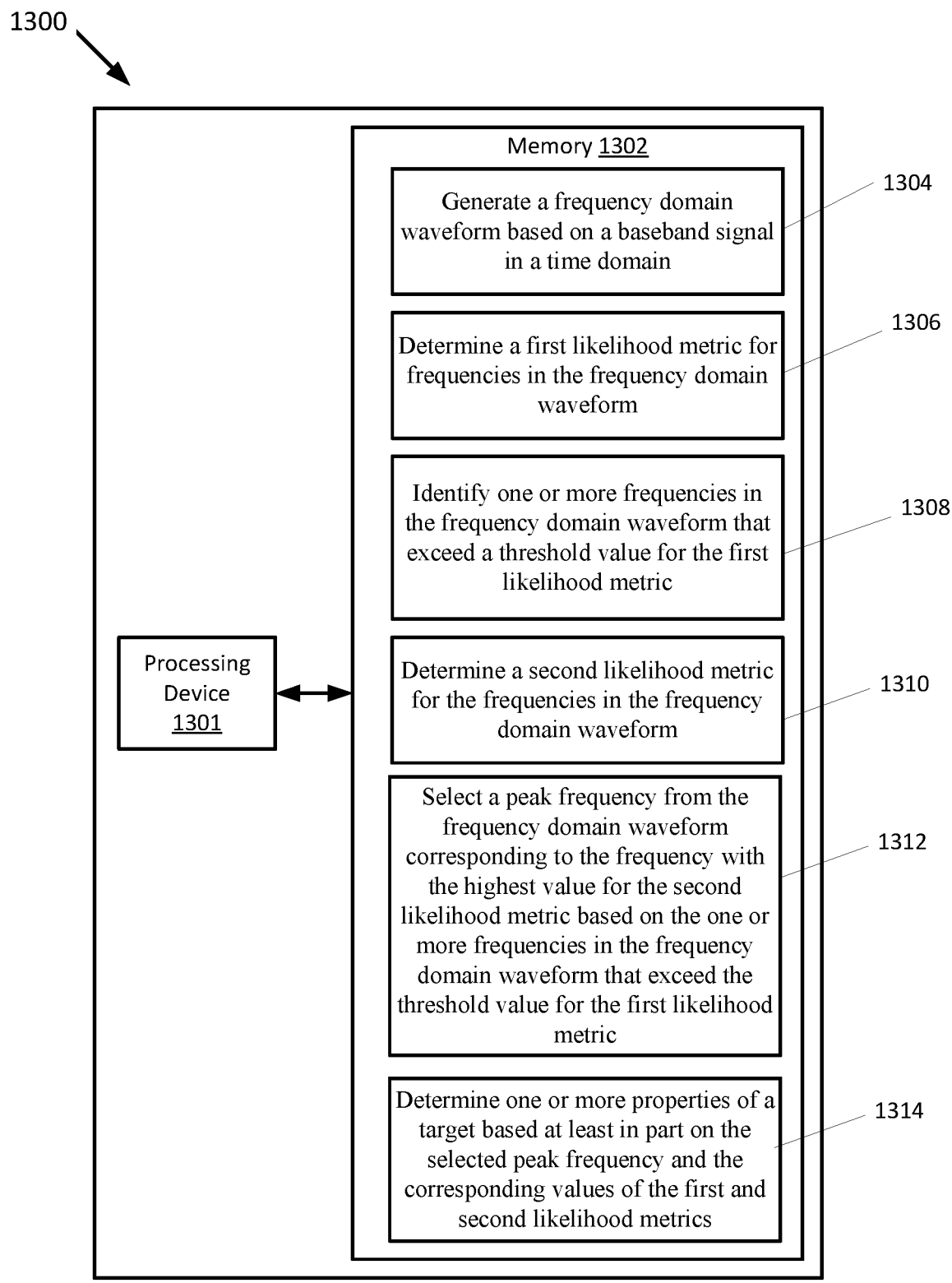
FIG. 13 is a block diagram of an example signal processing system according to the present disclosure.

FIG. 13 is a block diagram of a processing system 1300 (e.g., similar to signal processing system 303 illustrated and described above with respect to FIG. 4) in a LIDAR system such as LIDAR system 100 or LIDAR system 300. Processing system 1300 includes a processing device 1301, which may be any type of general purpose processing device or special purpose processing device designed for use in the LIDAR system. Processing device 1301 is coupled with a memory 1302, which can be any type of non-transitory computer-readable medium (e.g., RAM, ROM, PROM, EPROM, EEPROM, flash memory, magnetic disk memory or optical disk memory) containing instructions that, when executed by processing device 901 in the LIDAR system, cause the LIDAR system to perform the method described herein. In particular, memory 1302 includes instructions 1304 to generate a frequency domain waveform based on a baseband signal in a time domain. Instructions 1306 determine a first likelihood metric for frequencies in the frequency domain waveform. Instructions 1308 identify one or more frequencies in the frequency domain waveform that exceed a threshold value for the first likelihood metric. Instructions 1310 determining a second likelihood metric for the frequencies in the frequency domain waveform. Instructions 1312 select a peak frequency from frequency domain waveform corresponding to the frequency with the highest value for the second likelihood metric based on the one or more frequencies in the frequency domain waveform that exceed the threshold value for the first likelihood metric. Instructions 1314 determine one or more properties of a target based at least in part on the selected peak frequency.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LIDAR) system, comprising:
    an optical scanner to transmit an optical beam towards, and receive a return signal from, a target;
    an optical processing system coupled to the optical scanner to generate a baseband signal in a time domain from the return signal, the baseband signal comprising frequencies corresponding to LIDAR target ranges; and a signal processing system coupled to the optical processing system, comprising:
  a processor; and
  a memory operatively coupled to the processor, the memory to store instructions that, when executed by the processor, cause the LIDAR system to:
    generate a frequency domain waveform based on the baseband signal in the time domain;
    determine a first likelihood metric of a first type for first frequencies in the frequency domain waveform;
    generate a second waveform for the first frequencies based on the first likelihood metric of the first type;
    identify one or more frequencies in the second waveform that exceed a threshold value for the first likelihood metric of the first type;
    determine a second likelihood metric of a second type for the first frequencies in the frequency domain waveform, wherein the first type of the first likelihood metric is different from the second type of the second likelihood metric, and wherein at least one of the first likelihood metric or the second likelihood metric is selected based on characteristics of targets of interest;
    generate a third waveform for the first frequencies based on the second likelihood metric of the second type;
    select a peak frequency from the third waveform corresponding to a frequency with a highest value for the second likelihood metric of the second type based on the one or more frequencies in the second waveform that exceed the threshold value for the first likelihood metric of the first type and based on a width of a band of frequencies associated with the third waveform exceeding a minimum threshold width; and
    determine one or more properties of the target based at least in part on the selected peak frequency and corresponding values of the first likelihood metric of the first type and the second likelihood metric of the second type, wherein the one or more properties of the target comprise at least one of a range, a velocity, or a reflectivity.

2. The LIDAR system of claim 1, wherein the instructions, when executed by the processor, further cause the LIDAR system to:
determine that the peak frequency comprises the band of frequencies exceeding the threshold value.

3. The LIDAR system of claim 2, wherein peaks below the minimum threshold width correspond to noise events.

4. The LIDAR system of claim 1, wherein to identify the one or more frequencies in the second waveform, the instructions, when executed by the processor, cause the LIDAR system to identify the one or more frequencies in the second waveform that exceed the threshold value for the first likelihood metric of the first type prior to the selection of the peak frequency from the third waveform.

5. The LIDAR system of claim 1, wherein the first likelihood metric of the first type and the second likelihood metric of the second type each comprise one of a signal magnitude, a first reflectivity, or a signal-to-noise ratio.

6. The LIDAR system of claim 5, wherein the first likelihood metric of the first type and the second likelihood metric of the second type are selected based on previously collected information associated with the LIDAR system.

7. The LIDAR system of claim 1, wherein the instructions, when executed by the processor, further cause the LIDAR system to:
determine that there are no frequencies in the frequency domain waveform that exceed the threshold value for the first likelihood metric of the first type;
in response to the determination that there are no frequencies in the frequency domain waveform that exceed the threshold value for the first likelihood metric of the first type, determine a third likelihood metric for the first frequencies in the frequency domain waveform and a second threshold value for the first likelihood metric of the first type, wherein the third likelihood metric is different from at least the second likelihood metric;
identify one or more first frequencies in the frequency domain waveform that exceed the second threshold value for the first likelihood metric of the first type; and
select the peak frequency from the one or more first frequencies exceeding the second threshold value, the peak frequency corresponding to a first highest value for the third likelihood metric.

8. A method, comprising:
generating a frequency domain waveform based on a baseband signal in a time domain;
determining a first likelihood metric of a first type for frequencies in the frequency domain waveform;
generating a second waveform for the frequencies based on the first likelihood metric of the first type;
identifying, by a processing device, one or more frequencies in the second waveform that exceed a threshold value for the first likelihood metric of the first type;
determining a second likelihood metric of a second type for the frequencies in the frequency domain waveform, wherein the first type of the first likelihood metric is different from the second type of the second likelihood metric, and wherein at least one of the first likelihood metric or the second likelihood metric is selected based on characteristics of targets of interest;
generating a third waveform for the frequencies based on the second likelihood metric of the second type;
selecting, by the processing device, a peak frequency from the third waveform corresponding to a frequency with a highest value for the second likelihood metric of the second type based on the one or more frequencies in the second waveform that exceed the threshold value for the first likelihood metric of the first type and based on a width of a band of frequencies associated with the third waveform exceeding a minimum threshold width; and
determining one or more properties of a target based at least in part on the selected peak frequency and corresponding values of the first likelihood metric of the first type and the second likelihood metric of the second type, wherein the one or more properties of the target comprise at least one of a range, a velocity, or a reflectivity.

9. The method of claim 8, further comprising:
determining that the peak frequency comprises the band of frequencies exceeding the threshold value.

10. The method of claim 9, wherein peaks below the minimum threshold width correspond to noise.

11. The method of claim 8, wherein identifying the one or more frequencies in the second waveform that exceed the threshold value for the first likelihood metric of the first type occurs prior to selecting the peak frequency from the third waveform.

12. The method of claim 8, wherein the first likelihood metric of the first type and the second likelihood metric of the second type each comprise one of a signal magnitude, a first reflectivity, or a signal-to-noise ratio.

13. The method of claim 12, wherein the first likelihood metric of the first type and the second likelihood metric of the second type are selected based on previously collected information associated with a light detection and ranging (LIDAR) system.

14. The method of claim 8, further comprising:
determining that there are no frequencies in the frequency domain waveform that exceed the threshold value for the first likelihood metric of the first type;
in response to determining that there are no frequencies in the frequency domain waveform that exceed the threshold value for the first likelihood metric of the first type, determining a third likelihood metric for the frequencies in the frequency domain waveform and a second threshold value for the first likelihood metric of the first type, wherein the third likelihood metric is different from at least the second likelihood metric;
identifying one or more first frequencies in the frequency domain waveform that exceed the second threshold value for the first likelihood metric of the first type; and
selecting the peak frequency from the one or more first frequencies exceeding the second threshold value, the peak frequency corresponding to a first highest value for the third likelihood metric.

15. A light detection and ranging (LIDAR) system, comprising:
an optical scanner to transmit an optical beam towards, and receive a return signal from, a target;
an optical processing system coupled to the optical scanner to generate an electrical signal from the return signal, the electrical signal comprising frequencies corresponding to LIDAR target ranges; and
a signal processing system coupled to the optical processing system, comprising:
a processor; and
a memory operatively coupled to the processor, the memory to store instructions that, when executed by the processor, cause the LIDAR system to:
generate a frequency domain waveform based on the electrical signal, the frequency domain waveform comprising a plurality of frequency bins;
determine a first likelihood metric of a first type for the plurality of frequency bins in the frequency domain waveform;
generate a second waveform for the plurality of frequency bins based on the first likelihood metric of the first type;
identify one or more frequency bins in the second waveform that exceed a threshold value for the first likelihood metric of the first type;
determine a second likelihood metric of a second type for the plurality of frequency bins in the frequency domain waveform, wherein the first type of the first likelihood metric is different from the second type of the second likelihood metric, and wherein at least one of the first likelihood metric or the second likelihood metric is selected based on characteristics of targets of interest;
generate a third waveform for the plurality of frequency bins based on the second likelihood metric of the second type;
select a peak frequency from the third waveform corresponding to a frequency with a highest value for the second likelihood metric of the second type based on the one or more frequency bins in the second waveform that exceed the threshold value for the first likelihood metric of the first type and based on a width of a band of frequencies associated with the third waveform exceeding a minimum threshold width; and
determine one or more properties of the target based at least in part on the selected peak frequency and corresponding values of the first likelihood metric of the first type and the second likelihood metric of the second type, wherein the one or more properties of the target comprise at least one of a range, a velocity, or a reflectivity.

16. The LIDAR system of claim 15, wherein the to select the peak frequency, the instructions, when executed by the processor, cause the LIDAR system to select the peak frequency prior to the identification of the one or more frequency bins that exceed the threshold value, and wherein the instructions, when executed by the processor, cause the LIDAR system further to:
determine whether the selected peak frequency exceeds the threshold value for the second likelihood metric of the second type.

17. The LIDAR system of claim 15, wherein the instructions, when executed by the processor, further cause the LIDAR system to:
determine that none of the plurality of frequency bins exceed the threshold value for the first likelihood metric of the first type;
in response to the determination that none of the plurality of frequency bins exceed the threshold value for the first likelihood metric of the first type, identify one or more first frequency bins in the frequency domain waveform that exceed a lower threshold value than the threshold value;
determine a third likelihood metric for the plurality of frequency bins in the frequency domain waveform; and
select the peak frequency from the frequency domain waveform corresponding to a frequency bin with a first highest value for the third likelihood metric.

* * * * *